(12) United States Patent
Wahlroos et al.

(10) Patent No.: US 8,022,709 B2
(45) Date of Patent: Sep. 20, 2011

(54) METHOD AND APPARATUS FOR DETERMINING CIRCULAR CHARACTERISTIC

(75) Inventors: Ari Wahlroos, Vaasa (FI); Janne Altonen, Toijala (FI)

(73) Assignee: ABB Technology AG, Zurich (CH)

( * ) Notice: Subject to any disclaimer, the term of this patent is extended or adjusted under 35 U.S.C. 154(b) by 365 days.

(21) Appl. No.: 12/441,678

(22) PCT Filed: Sep. 19, 2006

(86) PCT No.: PCT/FI2006/050401
§ 371 (c)(1),
(2), (4) Date: Mar. 17, 2009

(87) PCT Pub. No.: WO2008/034936
PCT Pub. Date: Mar. 27, 2008

(65) Prior Publication Data
US 2009/0309612 A1    Dec. 17, 2009

(51) Int. Cl.
*G01R 31/08* (2006.01)
(52) U.S. Cl. .......... 324/521; 324/522; 324/525; 702/59; 361/48; 361/80
(58) Field of Classification Search .......... 324/521, 324/522, 500–520, 523–525, 86; 702/58–62, 702/65, 185; 361/42–50, 86, 76, 80
See application file for complete search history.

(56) References Cited

U.S. PATENT DOCUMENTS

| | | | |
|---|---|---|---|
| 3,569,785 A | 3/1971 | Durbeck et al. | |
| 4,212,046 A | 7/1980 | Andow et al. | |
| 4,344,143 A | 8/1982 | Kurosawa et al. | |
| 5,661,664 A * | 8/1997 | Novosel et al. | 700/293 |
| 6,518,767 B1 * | 2/2003 | Roberts et al. | 324/521 |
| 6,601,001 B1 * | 7/2003 | Moore | 702/59 |

FOREIGN PATENT DOCUMENTS
GB    2 064 900 A    6/1981

OTHER PUBLICATIONS

Form PCT/ISA/210 (International Search Report) dated Jun. 12, 2007.
Form PCT/ISA/237 (Written Opinion of the International Searching Authority) dated Jun. 12, 2007.
S. Jamali et al., "Robustness of Distance Relay With Mho Characteristic Against Fault Resistance", International Conference on Power System Technology—Powercon 2004, Nov. 21-24, 2004, pp. 1833-1838, Singapore.

* cited by examiner

*Primary Examiner* — Huy Phan
*Assistant Examiner* — Alesa Allgood
(74) *Attorney, Agent, or Firm* — Buchanan Ingersoll & Rooney PC

(57) ABSTRACT

A method and a system for determining a circular characteristic for distance protection of a three-phase electric line, the system comprising means for detecting a fault on the electric line, means for identifying a faulted phase or phases of the electric line, means for determining, at a measuring point, a first fault loop impedance by using voltage(s) of the faulted phase(s), a second fault loop impedance by using a polarization voltage and a third fault loop impedance by using predetermined line parameters, and means for determining a radius and midpoint of the circular characteristic.

22 Claims, 4 Drawing Sheets

A)

B)

METHOD AND APPARATUS FOR DETERMINING CIRCULAR CHARACTERISTIC

FIELD OF THE INVENTION

The invention relates to determining a circular characteristic, and more particularly to determining a circular characteristic for distance protection of a three-phase electric line.

BACKGROUND OF THE INVENTION

A distance relay is a protection relay, which is used to protect electric systems and parts thereof, such as electric lines, against faults. A traditional method of generating a distance protection function with circular characteristics is to compare the angle between two voltage phasors: an operating voltage phasor $S_1$ and a polarizing voltage phasor $S_2$. Phasor $S_1$ is also commonly known as "the line drop compensated voltage". They take the following form:

$$S_1 = U_{Lx} + \text{dir} \cdot (I_{Lx} + I_N \cdot K_N) \cdot Z_{1set} \tag{eq 2.1}$$

$$S_2 = U_{Lxpola} \tag{eq 2.2}$$

where
$U_{Lx}$=voltage phasor of faulted phase(s) x. For phase-to-earth elements the voltage is $U_{L1}$, $U_{L2}$ or $U_{L3}$. For phase-to-phase elements the voltage is $U_{L12}$, $U_{L23}$ or $U_{L31}$.

dir=−1, if operation direction is forward, +1, if operation direction is reverse.

$I_{Lx}$=current phasor of faulted phase(s). For phase-to-earth elements the current is $I_{L1}$, $I_{L2}$ or $I_{L3}$. For phase-to-phase elements the current is $I_{L12}$, $I_{L23}$ or $I_{L31}$.

$I_N$=residual current $(I_{L1}+I_{L2}+I_{L3})$ phasor. This term is zero for phase-to-phase elements.

$K_N$=residual compensation factor=$(Z_{0set}-Z_{1set})/(3 \cdot Z_{1set})$. This term is zero for phase-to-phase elements.

$Z_{1set}$=positive sequence line replica impedance.
$Z_{0set}$=zero sequence line replica impedance.
$U_{Lxpola}$=polarization voltage.

FIG. 1 illustrates examples of forward directional self-polarized circular characteristics in two cases: A) a fault inside the protection zone and B) a fault outside the protection zone. Note that since $S_1$ and $S_2$ are voltage phasors, the characteristic is drawn in the voltage plane.

From FIG. 1 it can be seen that the angle α between $S_1$ and $S_2$ can be used to detect whether the measured impedance lies inside the circle. If the angle α becomes greater than 90 degrees, the measured impedance lies inside the circle and a trip signal should be generated. At the circumference the angle α is 90 degrees.

Typically the angle comparison is implemented based on a torque-like relay algorithm utilizing either a cosine or sine phase comparator. These phase comparators emulate the behavior of an induction cup element, the amplitude representing the rotating cup torque and sign rotation direction.

With the cosine-comparator the torque-like equation is:

$$T_{mho} = re(S_1) \cdot re(S_2) + im(S_1) \cdot im(S_2) \tag{eq 2.3}$$

If $T_{mho}<0$ then impedance is inside the zone.

FIG. 1 is drawn assuming that the polarizing phasor $S_2$ was the voltage of the faulty phase. Such polarization method is called "self polarization". The drawback of self polarization is that in case of a close-in fault, the measured voltage may become too small and trip decision may become uncertain or delayed. Therefore, the polarizing voltage is typically chosen such as to have influence from the healthy phases. The most common types of polarization methods are cross- (or quadrature) polarization and positive sequence polarization. The polarization voltage may additionally include a memorized voltage part prior to fault inception to cope with close-in three phase faults. Table 1 shows cross- (or quadrature) polarization voltages for different fault loops.

TABLE 1

| Fault loop | Actual fault loop voltage | Cross- (or quadrature) polarization voltage |
|---|---|---|
| L1E | $U_{L1}$ | $j \cdot U_{L23}/\sqrt{3}$ |
| L2E | $U_{L2}$ | $j \cdot U_{L31}/\sqrt{3}$ |
| L3E | $U_{L3}$ | $j \cdot U_{L12}/\sqrt{3}$ |
| L12 | $U_{L12}$ | $-j \cdot U_{L3} \cdot \sqrt{3}$ or $j \cdot (U_{L23} - U_{L31})/\sqrt{3}$ |
| L23 | $U_{L23}$ | $-j \cdot U_{L1} \cdot \sqrt{3}$ or $j \cdot (U_{L31} - U_{L12})/\sqrt{3}$ |
| L31 | $U_{L31}$ | $-j \cdot U_{L2} \cdot \sqrt{3}$ or $j \cdot (U_{L12} - U_{L23})/\sqrt{3}$ |

FIG. 2 illustrates voltage triangles of a symmetrical three-phase system. The positive sequence polarization voltage $U_1$ can be calculated based on either phase-to-earth or phase-to-phase voltages as indicated in Table 2, which shows positive sequence polarization voltages for different fault loops.

TABLE 2

| Fault loop | Actual fault loop voltage | Positive sequence polarization voltage |
|---|---|---|
| L1E | $U_{L1}$ | $U_1 = (U_{L1} + \alpha^* U_{L2} + \alpha^{2*} U_{L3})/3$<br>$U_1 = (U_{L12} - \alpha^{2*} U_{L23})/3$<br>$U_1 = (U_{L12} + \alpha^* U_{L23} + \alpha^{2*} U_{L31}) \cdot \dfrac{1\angle -30°}{3 \cdot \sqrt{3}}$ |
| L2E | $U_{L2}$ | $U_1 \cdot 1\angle -120°$ |
| L3E | $U_{L3}$ | $U_1 \cdot 1\angle 120°$ |
| L12 | $U_{L12}$ | $U_1 \cdot \sqrt{3} \cdot 1\angle 30°$ |
| L23 | $U_{L23}$ | $U_1 \cdot \sqrt{3} \cdot 1\angle -90°$ |
| L31 | $U_{L31}$ | $U_1 \cdot \sqrt{3} \cdot 1\angle 150°$ |

An often undocumented feature of circular impedance characteristics is that the selection of polarization voltage affects the shape of the characteristics. In case of short-circuit faults the circle expands as a function of source impedance magnitude. In case of an earth fault, the circle expands as a function of source impedance and earthing impedance magnitude. The magnitude of expansion depends on the polarization method and it is different for cross-polarization and for positive sequence polarization. An example of circular characteristic expansion is illustrated in FIG. 3.

From FIG. 3 it can be noticed that the ohmic reach at angle θ is not affected by the expansion. The expansion of the characteristic is in fact a desired feature as it offers a better resistive coverage for close-in faults. Also the directionality is not affected by the expansion.

The circular characteristic is commonly used in distance protection relays. The application is typically short-circuit protection.

For earth-fault protection the desired shape of the protection zone is typically quadrilateral (polygonal), which enables detection of earth-faults with high fault resistance for the total line reach. The distance protection function with quadrilateral characteristics is typically implemented using an impedance mapping approach. This means that an impedance estimate is first calculated and the result is then compared in the impedance plane with operation zone boundaries. A typical quadrilateral characteristic has four or five boundary lines.

Typically distance protection terminals or relays include both circular and quadrilateral characteristics such that circular characteristics are implemented utilizing torque-like algorithms, while quadrilateral characteristics are implemented using the impedance mapping approach. A problem with this kind of arrangement is that the distance protection terminal or relay becomes complex.

BRIEF DESCRIPTION OF THE INVENTION

An object of the present invention is thus to provide a method and an apparatus for implementing the method so as to overcome the above problem or at least to alleviate it. The object of the invention is achieved by a method, a computer program product, a system and an apparatus which are characterized by what is stated in independent claims 1, 6, 7 and 12. Preferred embodiments of the invention are disclosed in the dependent claims.

The invention is based on the idea that fault loop impedance can be calculated independently from a zone shape calculation also in case of circular characteristics.

An advantage of the invention is that it reduces the required computational burden as fault loop impedance(s) can be calculated centrally. Furthermore, they can be utilized e.g. for both quadrilateral and circular characteristics whereby the circular and quadrilateral characteristics can both be implemented similarly. This is advantageous in case possible short-circuit and earth-fault measuring elements have different trip zone shapes. The invention further enables the circular characteristic expansion to be included in the impedance mapping approach. The invention also allows any kind of modeling for fault impedance calculation. As a result, operation analysis becomes simpler and more straightforward as different characteristics can all be analyzed similarly in the impedance plane.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The use of the method and system of the invention is not limited to any specific system, but they can be used in connection with various three-phase electric systems. The electric line can be a feeder, for example, and may be an overhead-line or a cable or a combination of both. The electric power system in which the invention is implemented can be an electric transmission or distribution network or a component thereof, for example, and may comprise several feeders. Moreover, the use of the invention is not limited to systems employing 50-Hz or 60-Hz fundamental frequencies or to any specific voltage level.

Figure 6:
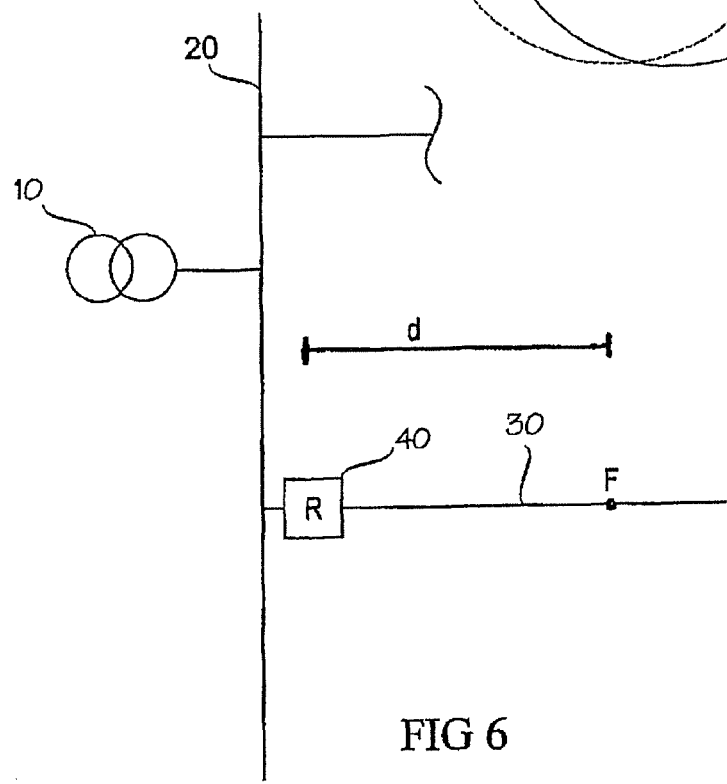
FIG. 6 is a diagram illustrating an electric network in which the invention can be used.

FIG. 6 is a simplified diagram illustrating an electric network in which the invention can be applied. The figure shows only the components necessary for understanding the invention. The exemplary network can be a network fed through a substation comprising a transformer 10 and a busbar 20. The illustrated network also comprises electric line outlets, i.e. feeders, of which one 30 is shown separately. The figure also shows a protective relay unit 40 at the beginning of line 30, and a point of fault F. It should be noted that there may be any number of feeders or other network elements in the network.

System current and voltage values used in the following are preferably obtained by a suitable measuring arrangement including e.g. current and voltage transducers (not shown in the figures) in connection with the electricity system. In most of the existing protection systems such values are readily available and thus the implementation of the invention does not necessarily require any separate measuring arrangements. How these values are obtained is not relevant to the basic idea of the invention and depends on the particular electricity system in which the invention is implemented.

According to an embodiment of the invention, the calculation procedure for a circular characteristic for distance protection of a three-phase electric line goes as follows:

First a fault F is detected on the electric line 30 and the faulted phase or phases of the electric line is determined based on information e.g. from a phase selector (not shown). The particular way in which the fault is detected and the faulted phase or phases are determined is not relevant to the basic idea of the invention. Next, at a measuring point which can be at the beginning of the electric line or at some other location, the following impedances are determined:

$Z_{loop}$=Fault loop impedance calculated by using voltage(s) of faulted phase(s), $Z_{loop\_polarization}$=Fault loop impedance calculated by using polarization voltage, and $Z_{loopset}$=Fault loop impedance calculated by using predetermined line parameters The analysis here assumes that the impedance of short-circuit loops includes line impedance ($Z_1$) and fault resistance ($R_F$) and the impedance of earth fault loops includes line impedance ($Z_1$), fault resistance ($R_F$) and earth return path impedance ($Z_N$) apart from $Z_{loopset}$, which does not include fault resistance. The particular way in which the impedances are determined or calculated is not relevant to the basic idea of the invention. However, one exemplary method for calculating the fault loop impedances ($Z_{loop}$) in case of a short-circuit is as follows (d is the per unit fault location):

$Z_{L12}=U_{L12}/I_{L12}=d \cdot Z_1+R_{FPP}$ (Fault loop L1 to L2)

$Z_{L23}=U_{L23}/I_{L23}=d \cdot Z_1+R_{FPP}$ (Fault loop L2 to L3)

$Z_{L31}=U_{L31}/I_{L31}=d \cdot Z_1+R_{FPP}$ (Fault loop L3 to L1)

$Z_{L123}=U_{L12}/I_{L12}=d \cdot Z_1+R_{FPP}$ (Fault loop L1 to L2 to L3)

Where in case of two-phase short-circuit, $R_{FPP}$ is half of the total physical fault resistance between phases. In case of three-phase short-circuit $R_{FPP}$ is the physical fault resistance per phase. Three-phase short-circuit due to its symmetrical nature could be calculated with any fault loop (here it is calculated similarly as the fault loop L1 to L2).

Similarly the fault loop impedance ($Z_{loop}$) in case of an earth fault can be calculated as follows:

$Z_{L1E}=U_{L1}/I_{L1}=d\cdot(Z_1+Z_N)+R_{FPE}$ (Fault loop L1 to earth)

$Z_{L2E}=U_{L2}/I_{L2}=d\cdot(Z_1+Z_N)+R_{FPE}$ (Fault loop L2 to earth)

$Z_{L3E}=U_{L3}/I_{L3}=d\cdot(Z_1+Z_N)+R_{FPE}$ (Fault loop L3 to earth)

Where $R_{FPE}$ is the physical fault resistance between phase and earth including arc and earthing resistances.

$Z_{loop}$ can then be obtained from the respective equation of fault loop impedance in question. For example, in case of fault loop from phase L1 to phase L2, $Z_{loop}=Z_{L12}=U_{L12}/I_{L12}$.

$Z_{loop\_polarization}$ can be obtained from the respective equation of fault loop impedance in question by replacing the faulted phase voltage in the equation with polarization voltage selected from table 3. For example, in case of positive sequence polarization, the fault loop impedance from phase L1 to phase L2 is: $Z_{loop\_polarization}=U_1\cdot\sqrt{3}\cdot 1\angle 30°/I_{L12}$.

TABLE 3

Voltages for calculation of fault loop impedance $Z_{loop\_polarization}$:

| Fault loop | Self (=faulty phase) Polarization | Cross (=quadrature) Polarization | Positive sequence Polarization |
|---|---|---|---|
| L1E | $U_{L1}$ | $j\cdot U_{L23}/\sqrt{3}$ | $U_1 = (U_{L1} + a\cdot U_{L2} + a^2\cdot U_{L3})/3 =$ $(U_{L12} - a^2\cdot U_{L23})/3 =$ $(U_{L12} + a\cdot U_{L23} + a^2\cdot U_{L31})\cdot$ $1\angle -30°/(3\cdot\sqrt{3})$ |
| L2E | $U_{L2}$ | $j\cdot U_{L31}/\sqrt{3}$ | $U_1\cdot 1\angle -120°$ |
| L3E | $U_{L3}$ | $j\cdot U_{L12}/\sqrt{3}$ | $U_1\cdot 1\angle 120°$ |
| L12 | $U_{L12}$ | $-j\cdot U_{L3}\cdot\sqrt{3}$ or $j\cdot(U_{L23}-U_{L31})/\sqrt{3}$ | $U_1\cdot\sqrt{3}\cdot 1\angle 30°$ |
| L23 | $U_{L23}$ | $-j\cdot U_{L1}\cdot\sqrt{3}$ or $j\cdot(U_{L31}-U_{L12})/\sqrt{3}$ | $U_1\cdot\sqrt{3}\cdot 1\angle -90°$ |
| L31 | $U_{L31}$ | $-j\cdot U_{L2}\cdot\sqrt{3}$ or $j\cdot(U_{L12}-U_{L23})/\sqrt{3}$ | $U_1\cdot\sqrt{3}\cdot 1\angle 150°$ |
| L123 | | Voltage including memorized part | |

In case of a close-in three-phase fault directly in front of or behind the relay location, or other measuring point, the polarization voltage may become too small for secure determination of fault direction. Therefore, the polarization voltage phasor $S_2$ for three-phase fault loop should preferably contain a memorized voltage part prior to fault. For example in case of positive sequence polarization, the polarization voltage could include 15% of memory voltage: $S_2=0.85\cdot U_1\cdot\sqrt{3}\cdot 1\angle +°+0.15\cdot U_{1memory}\cdot\sqrt{3}\cdot 1\angle 30°$. Memorized voltage part here refers to voltage prior to fault occurrence, which is stored in a voltage memory (cyclic buffer).

$Z_{loopset}$ is preferably obtained from the following equations by using predetermined line parameters:

$Z_{loopset}=R_1+j\cdot X_1$ (for short circuit loops)

$=(R_1+R_N)+j\cdot(X_1+X_N)$ (for earth fault loops)

where
$R_1$=positive sequence line resistance
$R_N$=earth return path resistance=$(R_0-R_1)/3$
$R_0$=zero sequence line resistance
$X_1$=positive sequence line reactance
$X_N$=earth return path reactance=$(X_0-X_1)/3$
$X_0$=zero sequence line reactance Finally, a radius (r) and a midpoint (m) of the circular characteristic are calculated using the following equations:

$r=|(K_2-K_1)/2|$ (eq 5.1)

$m=\text{dir}\cdot(Z_{loopset}+(K_1-K_2)/2)$ (eq 5.2)

where
$K_2$=polarization impedance phasor=$Z_{loop\_polarization}$
$K_1$=operating impedance phasor=$Z_{loop}-Z_{loopset}$
dir=+1, if operation direction is forward; −1, if operation direction is reverse.

Figure 4:
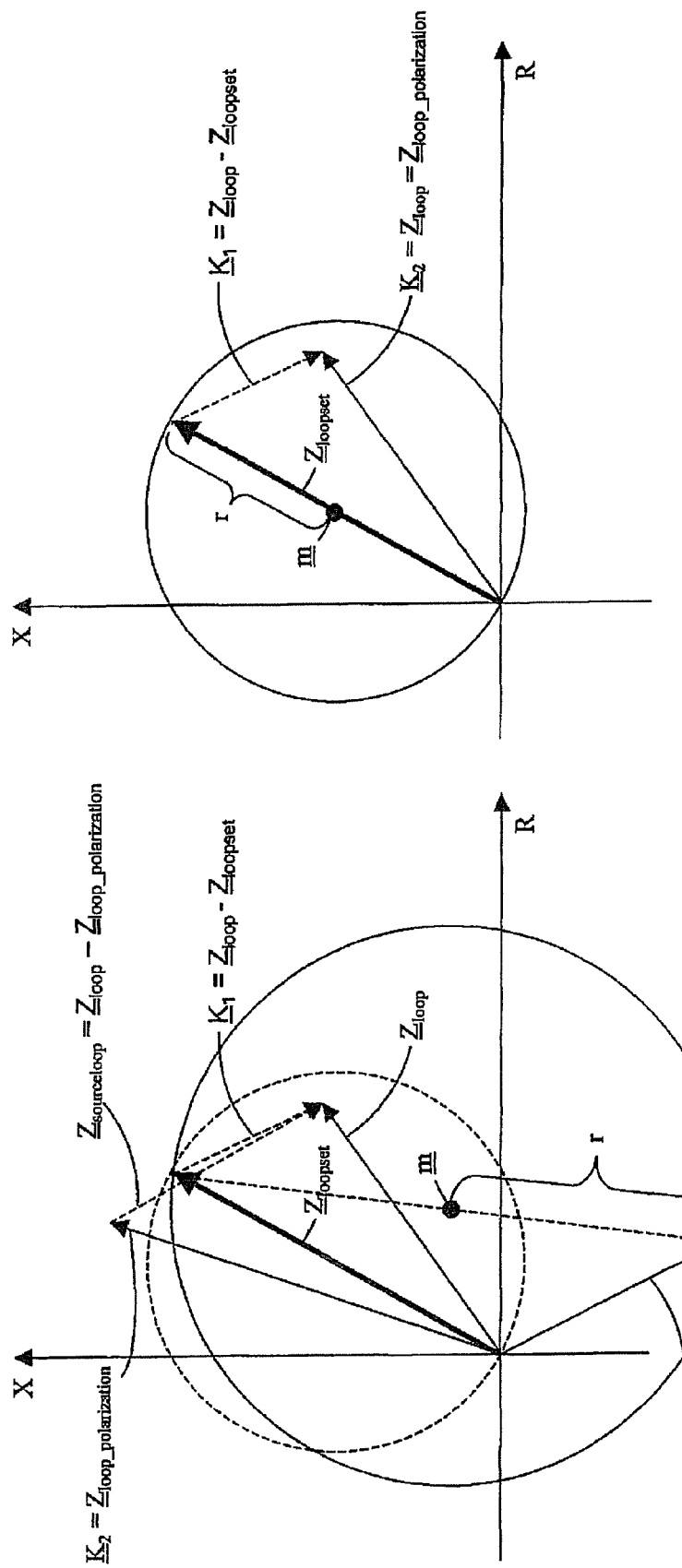
FIG. 4 shows examples of circular characteristics.

FIG. 4 shows examples of circular characteristics; a general case on the left and a self-polarized characteristic on the right. In case of self polarization, $Z_{loop\_polarization}=Z_{loop}$, and thus the equations for radius (r) and midpoint (m) above can be reduced as follows:

$r=|0.5\cdot Z_{loopset}|$ $m=\text{dir}\cdot 0.5\cdot Z_{loopset}$

In other words, the radius and midpoint can be determined based entirely on predetermined line parameters of the protected electric line. Thus the circle is static in the impedance plane.

In case of cross- or positive sequence polarization, the size and location of the circle are determined by the prevailing system conditions (see FIG. 4). In case of short-circuit faults the circle expands as a function of source impedance magnitude (cross-polarization: $Z_{sourceloop}=Z_{1source}$, positive sequence polarization: $Z_{sourceloop}=Z_{1source}/2$). In case of earth fault, the circle expands as a function of source impedance and earthing impedance magnitude (cross-polarization: $Z_{sourceloop}=(2\cdot Z_{1source}+Z_{0source})/3+Z_E$, positive sequence polarization: $Z_{sourceloop}=(Z_{1source}+Z_{0source})/3+Z_E$).

According to an embodiment of the invention the calculated fault loop impedance $Z_{loop}$ is compared against the geometric shape of the determined circular characteristic; and it is determined whether the calculated fault loop impedance $Z_{loop}$ is inside the circle of the determined circular characteristic. According to an embodiment of the invention, the calculated fault loop impedance $Z_{loop}=R_{loop}+j\cdot X_{loop}$ is determined to be inside the circle of the determined circular characteristic, if the following equation is true:

$(R_{loop}-\text{Re}(m))^2+(X_{loop}-\text{Im}(m))^2-r<0$.

Figure 1:
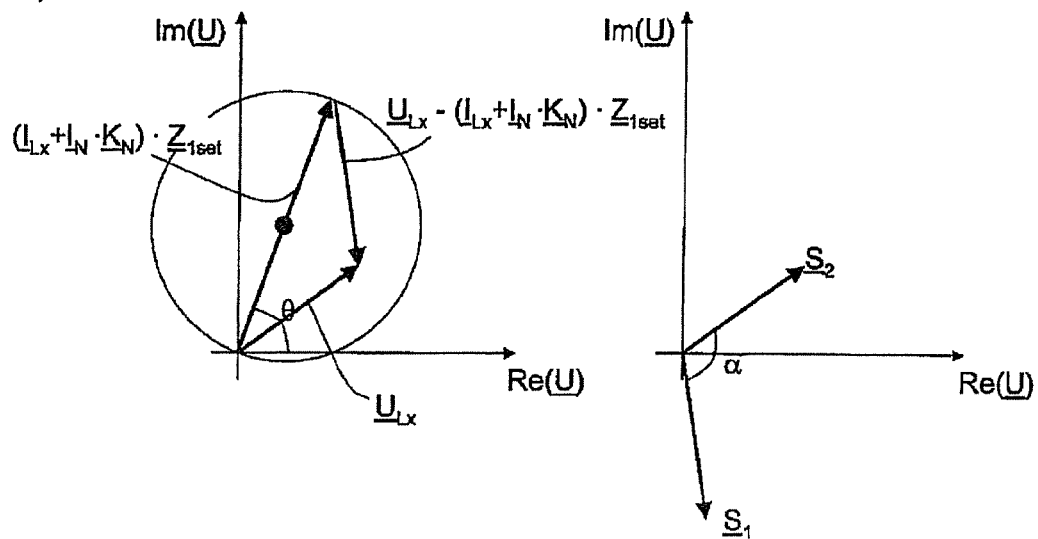
FIG. 1 shows examples of forward directional self-polarized circular characteristics in two cases.
Figure 1:
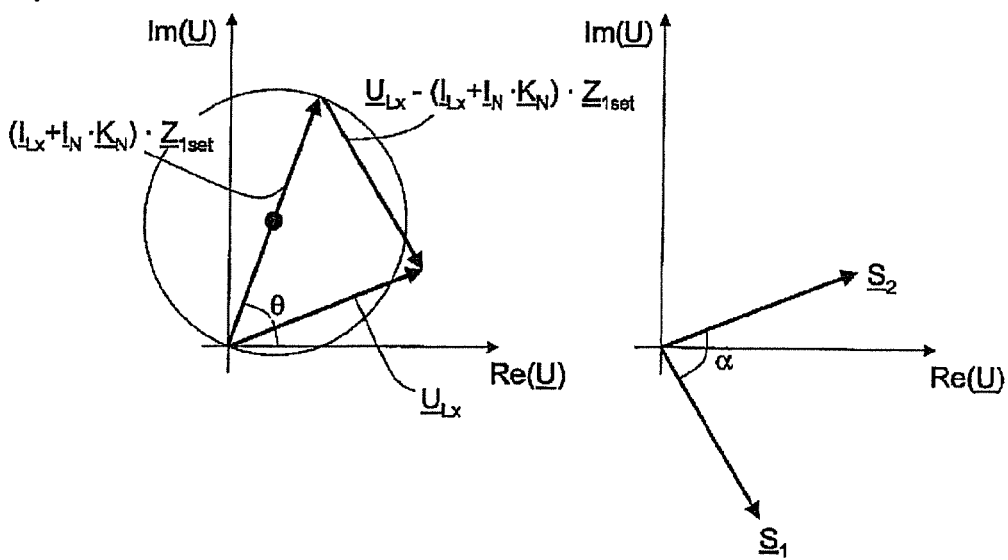
Figure 2:
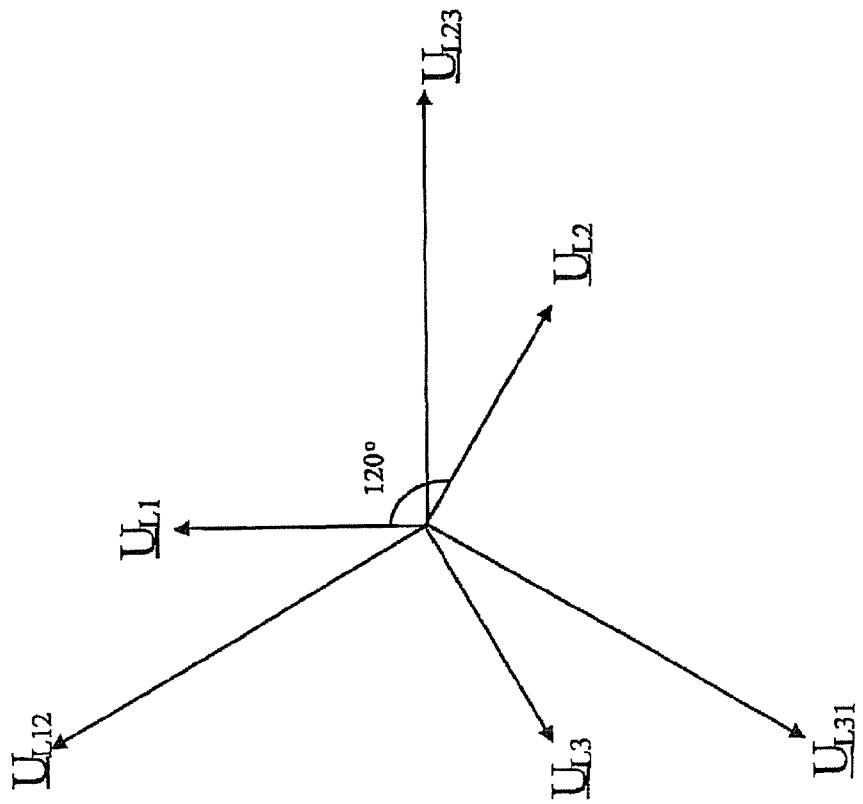
FIG. 2 shows voltage triangles of a symmetrical three-phase system.
Figure 2:
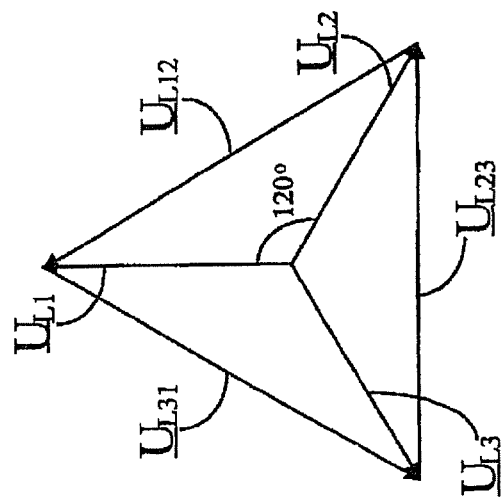
Figure 3:
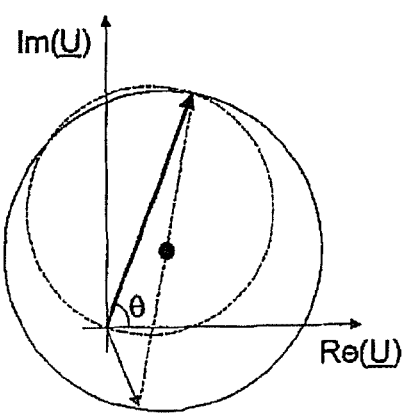
FIG. 3 shows an example of circular characteristic expansion.
Figure 5:
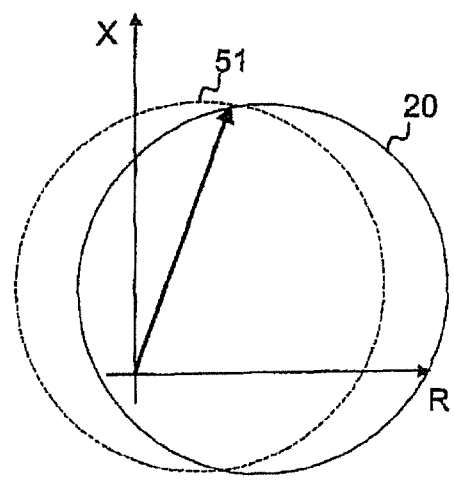
FIG. 5 illustrates an example of the adjustment of a circular characteristic according to an embodiment of the invention.

After the circular characteristic has been determined i.e. the radius (r) and midpoint (m) of the expanded circle have been solved, the characteristic could be freely adjusted in the impedance plane. FIG. 5 illustrates an example of an embodiment of the invention in which the circle is moved from the balance point 51 to a new location 52 in order to provide increased coverage for fault resistance. The characteristic can also be adjusted in some other way.

A system for determining a circular characteristic for distance protection of a three-phase electric line according to an embodiment of the invention may be implemented such that it comprises a detection unit which detects a fault on the electric line, an identification unit, which identifies a faulted phase or phases of the electric line, and a calculation unit which determines the impedances and the radius and midpoint of the circular characteristic as described above. Here the term 'unit' refers generally to a physical or logical entity, such as a physical device or a part thereof or a software routine. The other embodiments of the invention described above may be implemented e.g. with the calculation unit or one or more additional units. The above-mentioned detection, identification and calculation units and possible additional units may be physically separate units or implemented as one entity. One or more of these units may reside in the protective relay unit 40 of FIG. 6, for example.

When the fault detection and identification of the faulted phase are performed by a separate unit or units which are possibly already present in the system to be protected, the invention can be implemented with an apparatus which receives the fault detection information and indication of the faulted phase from such units. According to an embodiment of the invention, such an apparatus is configured to determine, in response to receiving an indication of a fault on the electric line and of a faulted phase or phases of the electric line, the impedances and the radius and the midpoint of the circular characteristic as described above. Such an apparatus may also be configured to implement the other embodiments of the invention described above.

The system and apparatus according to embodiments of the invention can be implemented by means of a computer or corresponding digital signal processing equipment with suitable software therein, for example. Such a computer or digital signal processing equipment preferably comprises at least a memory providing storage area used for arithmetical operations and a processor, such as a general-purpose digital signal processor (DSP), for executing the arithmetical operations. It is also possible to use a specific integrated circuit or circuits, or corresponding components and devices for implementing the functionality according to various embodiments of the invention.

The invention can be implemented in existing system elements, such as various protective relays or relay arrangements, or by using separate dedicated elements or devices in a centralized or distributed manner. Present protective devices for electric systems, such as protective relays, typically comprise processors and memory that can be utilized in the functions according to embodiments of the invention. Thus, all modifications and configurations required for implementing an embodiment of the invention e.g. in existing protective devices may be performed as software routines, which may be implemented as added or updated software routines. If the functionality of the invention is implemented by software, such software can be provided as a computer program product comprising computer program code which, when run on a computer, causes the computer or corresponding arrangement to perform the functionality according to the invention as described above. Such a computer program code can be stored on a computer readable medium, such as suitable memory means, e.g. a flash memory or a disc memory from which it is loadable to the unit or units executing the program code. In addition, such a computer program code implementing the invention can be loaded to the unit or units executing the computer program code via a suitable data network, for example, and it can replace or update a possibly existing program code.

It will be obvious to a person skilled in the art that, as the technology advances, the inventive concept can be implemented in various ways. The invention and its embodiments are not limited to the examples described above but may vary within the scope of the claims.

The invention claimed is:

1. A method for determining a circular characteristic for distance protection of a three-phase electric line, the method comprising:
   detecting a fault on the electric line;
   identifying a faulted phase or phases of the electric line;
   determining, at a measuring point, a first fault loop impedance by using voltage(s) of the faulted phase(s), a second fault loop impedance by using a polarization voltage and a third fault loop impedance by using predetermined line parameters; and
   determining a radius r and a midpoint m of the circular characteristic according to the following equations:

$$r=|(K_2-K_1)/2|$$

$$m=\text{dir}\cdot(Z_{loopset}+(K_1-K_2)/2), \text{ where}$$

$K_2$=polarization phasor=$Z_{loop\_polarization}$
   $Z_{loop\_polarization}$=the second fault loop impedance determined by using polarization voltage
   $K_1$=operating phasor=$Z_{loop}-Z_{loopset}$
   $Z_{loop}$=the first fault loop impedance determined by using voltage(s) of faulted phase(s)
   $Z_{loopset}$=the third fault loop impedance determined by using predetermined line parameters
   dir=+1, if operation direction is forward; −1, if operation direction is reverse.

2. A computer program product comprising computer program code embodied on a computer readable medium, wherein the execution of the program code in a computer causes the computer to carry out the steps of the method according to claim 1.

3. The method of claim 1, the method comprising:
   comparing the determined first fault loop impedance against the geometric shape of the determined circular characteristic; and
   determining whether the determined first fault loop impedance is inside the circle of the determined circular characteristic.

4. A computer program product comprising computer program code embodied on a non-transitory computer readable medium, wherein the execution of the program code in a computer causes the computer to carry out the steps of the method according to claim 3.

5. The method of claim 1, the method comprising adjusting the determined circular characteristic.

6. The method of claim 5, wherein the determined circular characteristic is adjusted by adjusting the location of its midpoint in the impedance plane.

7. A computer program product comprising computer program code embodied on a non-transitory computer readable medium, wherein the execution of the program code in a computer causes the computer to carry out the steps of the method according to claim 5.

8. The method of claim 3, wherein the determined first fault loop impedance $Z_{loop}=R_{loop}+j\cdot X_{loop}$ is determined to be inside the circle of the determined circular characteristic if the following equation is true:

$$(R_{loop}-Re(m))^2+(X_{loop}-Im(m))^2-r<0.$$

9. A computer program product comprising computer program code embodied on a non-transitory computer readable medium, wherein the execution of the program code in a computer causes the computer to carry out the steps of the method according to claim 8.

10. A system for determining a circular characteristic for distance protection of a three-phase electric line, the system comprising:
  means for detecting a fault on the electric line;
  means for identifying a faulted phase or phases of the electric line;
  means for determining, at a measuring point, a first fault loop impedance by using voltage(s) of the faulted phase(s), a second fault loop impedance by using a polarization voltage and a third fault loop impedance by using predetermined line parameters; and
  means for determining a radius r and a midpoint m of the circular characteristic according to the following equations:

$r=|(K_2-K_1)/2|$ $m=\text{dir}\cdot(Z_{loopset}+(K_1-K_2)/2)$, where $K_2$=polarization phasor=$Z_{loop\_polarization}$
  $Z_{loop\_polarization}$=the second fault loop impedance determined by using polarization voltage
  $K_1$=operating phasor=$Z_{loop}-Z_{loopset}$
  $Z_{loop}$=the first fault loop impedance determined by using voltage(s) of faulted phase(s)
  $Z_{loopset}$=the third fault loop impedance determined by using predetermined line parameters
  dir=+1, if operation direction is forward; −1, if operation direction is reverse.

11. The system of claim 10, the system comprising:
  means for comparing the determined first fault loop impedance against the geometric shape of the determined circular characteristic; and
  means for determining whether the determined first fault loop impedance is inside the circle of the determined circular characteristic.

12. The system of claim 11, the system comprising means for determining that the determined first fault loop impedance $Z_{loop}=R_{loop}+j\cdot X_{loop}$ is inside the circle of the determined circular characteristic if the following equation is true:

$(R_{loop}-Re(m))^2+(X_{loop}-Im(m))^2-r<0$.

13. The system of claim 10, the system comprising means for adjusting the determined circular characteristic.

14. The system of claim 13, the system comprising means for adjusting the determined circular characteristic by adjusting the location of its midpoint in the impedance plane.

15. An apparatus for determining a circular characteristic for distance protection of a three-phase electric line, the apparatus comprising: means for determining, in response to receiving an indication of a fault on the electric line and of a faulted phase or phases of the electric line, at a measuring point a first fault loop impedance by using voltage(s) of the faulted phase(s), a second fault loop impedance by using a polarization voltage and a third fault loop impedance by using predetermined line parameters, and to determine a radius r and a midpoint m of the circular characteristic according to the following equations:

$r=|(K_2-K_1)/2|$ $m=\text{dir}\cdot(Z_{loopset}+(K_1-K_2)/2)$, where $K_2$=polarization phasor=$Z_{loop\_polarization}$
  $Z_{loop\_polarization}$=the second fault loop impedance determined by using polarization voltage
  $K_1$=operating phasor=$Z_{loop}-Z_{loopset}$
  $Z_{loop}$=the first fault loop impedance determined by using voltage(s) of faulted phase(s)
  $Z_{loopset}$=the third fault loop impedance determined by using predetermined line parameters
  dir=+1, if operation direction is forward; −1, if operation direction is reverse.

16. The apparatus of claim 15, the apparatus comprising a protective relay.

17. The apparatus of claim 15, the apparatus comprising: means for comparing the determined first fault loop impedance against the geometric shape of the determined circular characteristic and to determine whether the determined first fault loop impedance is inside the circle of the determined circular characteristic.

18. The apparatus of claim 17, the apparatus comprising means for determining that the determined first fault loop impedance $Z_{loop}=R_{loop}+j\cdot X_{loop}$ is inside the circle of the determined circular characteristic if the following equation is true:

$(R_{loop}-Re(m))^2+(X_{loop}-Im(m))^2-r<0$.

19. The apparatus of claim 15, the apparatus comprising means for adjusting the determined circular characteristic.

20. The apparatus of claim 19, the apparatus comprising means for adjusting the determined circular characteristic by adjusting the location of its midpoint in the impedance plane.

21. A system for determining a circular characteristic for distance protection of a three-phase electric line, the system comprising:
  a detection unit for detecting a fault on the electric line;
  an identification unit for identifying a faulted phase or phases of the electric line; and
  a microprocessor coupled to a memory arranged as a calculation unit for determining, at a measuring point, a first fault loop impedance by using voltage(s) of the faulted phase(s), a second fault loop impedance by using a polarization voltage and a third fault loop impedance by using predetermined line parameters, and for determining a radius r and a midpoint m of the circular characteristic according to the following equations:

$r=|(K_2-K_1)/2|$ $m=\text{dir}\cdot(Z_{loopset}+(K_1-K_2)/2)$, where $K_2$=polarization phasor=$Z_{loop\_polarization}$
  $Z_{loop\_polarization}$=the second fault loop impedance determined by using polarization voltage
  $K_1$=operating phasor=$Z_{loop}-Z_{loopset}$
  $Z_{loop}$=the first fault loop impedance determined by using voltage(s) of faulted phase(s)
  $Z_{loopset}$=the third fault loop impedance determined by using predetermined line parameters
  dir=+1, if operation direction is forward; −1, if operation direction is reverse.

22. An apparatus for determining a circular characteristic for distance protection of a three-phase electric line, comprising:
  a microprocessor coupled to a memory arranged as a calculation unit for determining, in response to receiving an indication of a fault on the electric line and of a faulted phase or phases of the electric line, at a measuring point a first fault loop impedance by using voltage(s) of the faulted phase(s), a second fault loop impedance by using a polarization voltage and a third fault loop impedance by using predetermined line parameters, and for determining a radius r and a midpoint m of the circular characteristic according to the following equations:

$$r = |(K_2 - K_1)/2|$$

$$m = \mathrm{dir} \cdot (Z_{loopset} + (K_1 - K_2)/2), \text{ where}$$

$K_2$ = polarization phasor = $Z_{loop\_polarization}$
$Z_{loop\_polarization}$ = the second fault loop impedance determined by using polarization voltage
$K_1$ = operating phasor = $Z_{loop} - Z_{loopset}$
$Z_{loop}$ = the first fault loop impedance determined by using voltage(s) of faulted phase(s)
$Z_{loopset}$ = the third fault loop impedance determined by using predetermined line parameters
dir = +1, if operation direction is forward; −1, if operation direction is reverse.

* * * * *